(12) United States Patent
Yang

(10) Patent No.: US 6,700,237 B1
(45) Date of Patent: Mar. 2, 2004

(54) ENCLOSED AIR COOLER DEVICE FOR A ROTATIONAL ELECTRICAL MACHINE

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 39 days.

(21) Appl. No.: 09/628,427

(22) Filed: Jul. 28, 2000

(51) Int. Cl.$^7$ ............... H02K 9/00; F24H 3/00
(52) U.S. Cl. ............... 310/58; 310/54; 310/62; 310/63; 310/64; 165/47
(58) Field of Search ............ 310/52–58, 59–60 R, 310/62–64, 60 A, 89, 91; 165/47, 104.14, 122; 29/596–598

(56) References Cited

U.S. PATENT DOCUMENTS

| | | | |
|---|---|---|---|
| 3,610,975 A | * | 10/1971 | Onjanow |
| 3,725,705 A | * | 4/1973 | Borinski ............... 310/308 |
| 3,749,953 A | * | 7/1973 | Baumann et al. ......... 310/62 |
| 4,244,098 A | * | 1/1981 | Barcus ................. 29/596 |
| 4,742,257 A | * | 5/1988 | Carpenter |
| 4,814,653 A | * | 3/1989 | Hasegawa et al. ........ 310/62 |
| 4,839,547 A | * | 6/1989 | Lordo et al. .......... 310/60 A |
| 5,770,899 A | * | 6/1998 | Hayashi ............... 310/54 |
| 5,925,947 A | * | 7/1999 | Kajiwara et al. ........ 310/64 |
| 6,078,115 A | * | 6/2000 | Uchida et al. ........ 310/58 |
| 6,114,784 A | * | 9/2000 | Nakano ............... 310/59 |

FOREIGN PATENT DOCUMENTS

JP 57-68640 * 4/1982 ............... 310/58

* cited by examiner

Primary Examiner—Tran N. Nguyen
(74) Attorney, Agent, or Firm—Bacon & Thomas, PLLC

(57) ABSTRACT

An air cooler device for an enclosed rotational electrical machine includes an air inlet and an air outlet provided in the casing of the electrical machine, and a fan simultaneously driven by the machine's power output shaft, an independently installed fan device, or both a simultaneously driven and an independently installed fan device. The fan or fans pump air or other selected gases inside the rotational electrical machine to allow a cooling air stream to flow through the outlet to an air cooler for indirect heat dissipation, and then back to the rotational electrical machine through the inlet.

21 Claims, 21 Drawing Sheets

US 6,700,237 B1

ENCLOSED AIR COOLER DEVICE FOR A ROTATIONAL ELECTRICAL MACHINE

BACKGROUND OF THE INVENTION (a) Field of the Invention

An air cooler device for an enclosed rotational electrical machine includes an innovative cooling air flow circuit structure in which the high temperature air flow inside the enclosed rotational electrical machine is pumped to an outside cooler device and then pumped back into the enclosed rotational electrical machine.

(b) Description of the Prior Art

The conventional cooling methods for enclosed type electrical machines usually adopt the free air cooling (as shown in FIG. 1 and FIG. 2), i.e., one or more than one dissipating fins 101a are installed at the outside casing of the enclosed type rotational electrical machine 10a to dissipate the accumulated heat of the rotational electrical machine through the free air convection for cooling; or adopt the external air forced cooling method (as shown in FIG. 3), i.e., the enclosed type rotational electrical machine 10b is further installed with a fan 101b to blow the air for cooling; or adopt the liquid cooling method (as shown in FIG. 4), i.e., the rotational electrical machine 10c is cooled by the external coolant 101c. The disadvantage of the aforesaid cooling technology is that the enclosed type rotational electrical machine's internal heat flow cannot be pumped out directly but must rely on the enclosed type electrical machine's casing to dissipate the internally accumulated heat resulting in a higher temperature difference between the inside and outside. Therefore, the heat dissipation is not very effective, which affects the rotational electrical machine's performance very much.

SUMMARY OF THE INVENTION

The invention is an innovative design of an enclosed type air cooler device for a rotational electrical machine, in which the high temperature air flow inside the enclosed type rotational electrical machine is pumped out to an outside cooler device in an enclosed type flow circuit and is then pumped back to the enclosed type rotational electrical machine inside without jeopardizing the enclosed nature of the machine.

DETAILED DESCRIPTION OF THE PREFERRED EMBODIMENTS

The enclosed type air cooler device of the preferred embodiment of the invention is mainly constituted by a rotational electrical machine and a cooler device, and includes the following.

A rotational electrical machine which is mainly referred to the rotational machines such as motors or generators, etc., whereof it is characterized that a air inlet and an air outlet are provided at its casing and through a fan simultaneously driven by the power output shaft of the rotational electrical machine, or an independently installed fan device or both of them installed simultaneously to pump the air or other selected gases inside the rotational electrical machine to allow the cooling air stream flow through the outlet to the enclosed type air cooler for indirect heat dissipation, then is pumped back to the rotational electrical machine;

A cooler device, whereof it and the rotational electrical machine casing appear individually independent structures and are further combined, or it and the rotational electrical machine appear in an integrated structure, or it and the casing of other peripheral mechanisms with cooling effects (such as the driving device casing or load casing) appear in an integrated structure; therein outside of the cooler device can be installed with heat dissipating fins for free air cooling or fanned air cooling or coolant cooling, whereof the cooler devices are constituted by tubular shape structures or other geometric shape structures, whereof its interior appears in tubular shape or air chamber type structures and the heat absorbing fins can be installed to absorb and transfer the heat energy for dissipation to the outside; wherein the internal air flow circuit or air chamber can be an empty space or can be installed with a air filter device or can be simultaneously installed with an clean cover or a clean plug for opening and closing to do cleaning and maintenance as well as removing the condensed moisture or internal eroded fragment powders such as the DC machine brush fragment powder.

Figure 2:
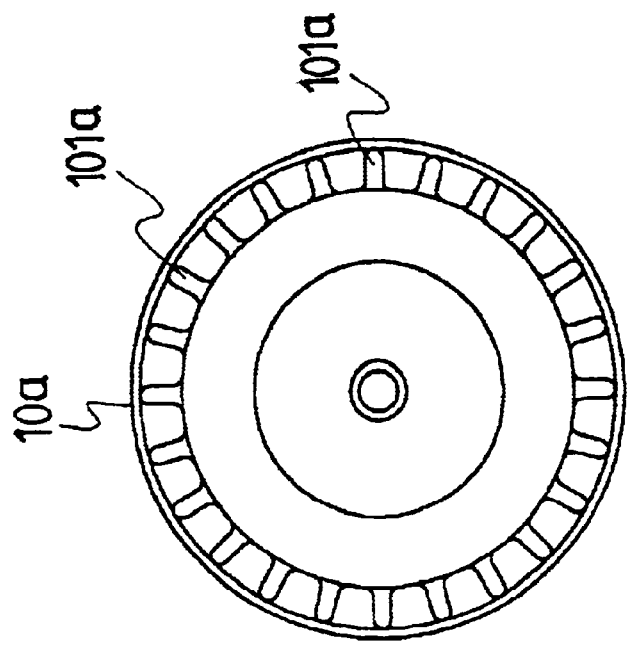
FIG. 2 is the side view of the conventional free cooling structure of the enclosed type electrical machines.
Figure 1:
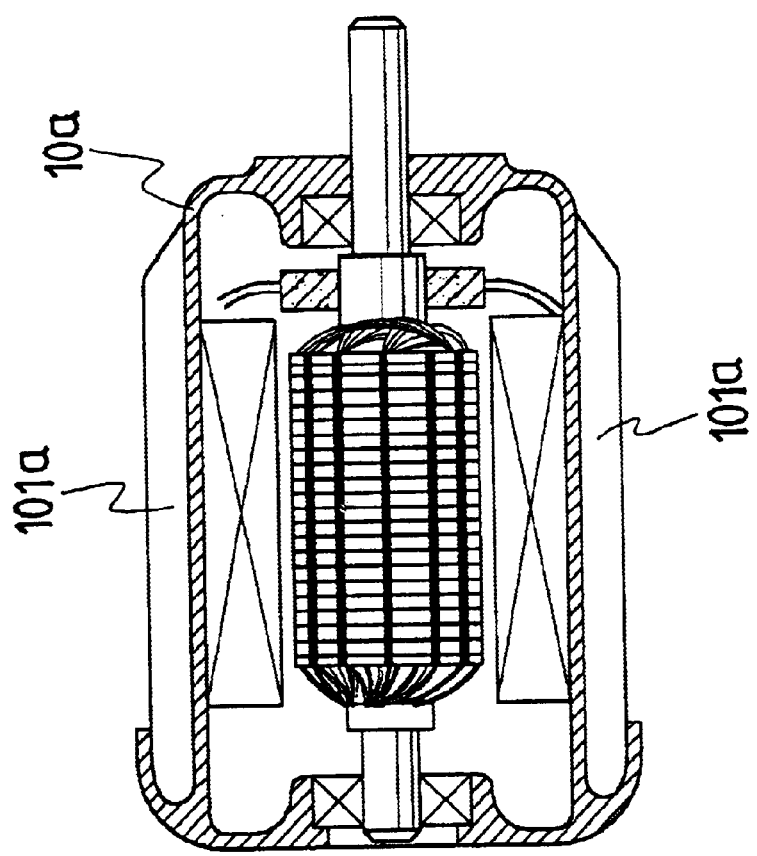
FIG. 1 is a diagram of the conventional free air cooling structure of the enclosed type electrical machines.
Figure 3:
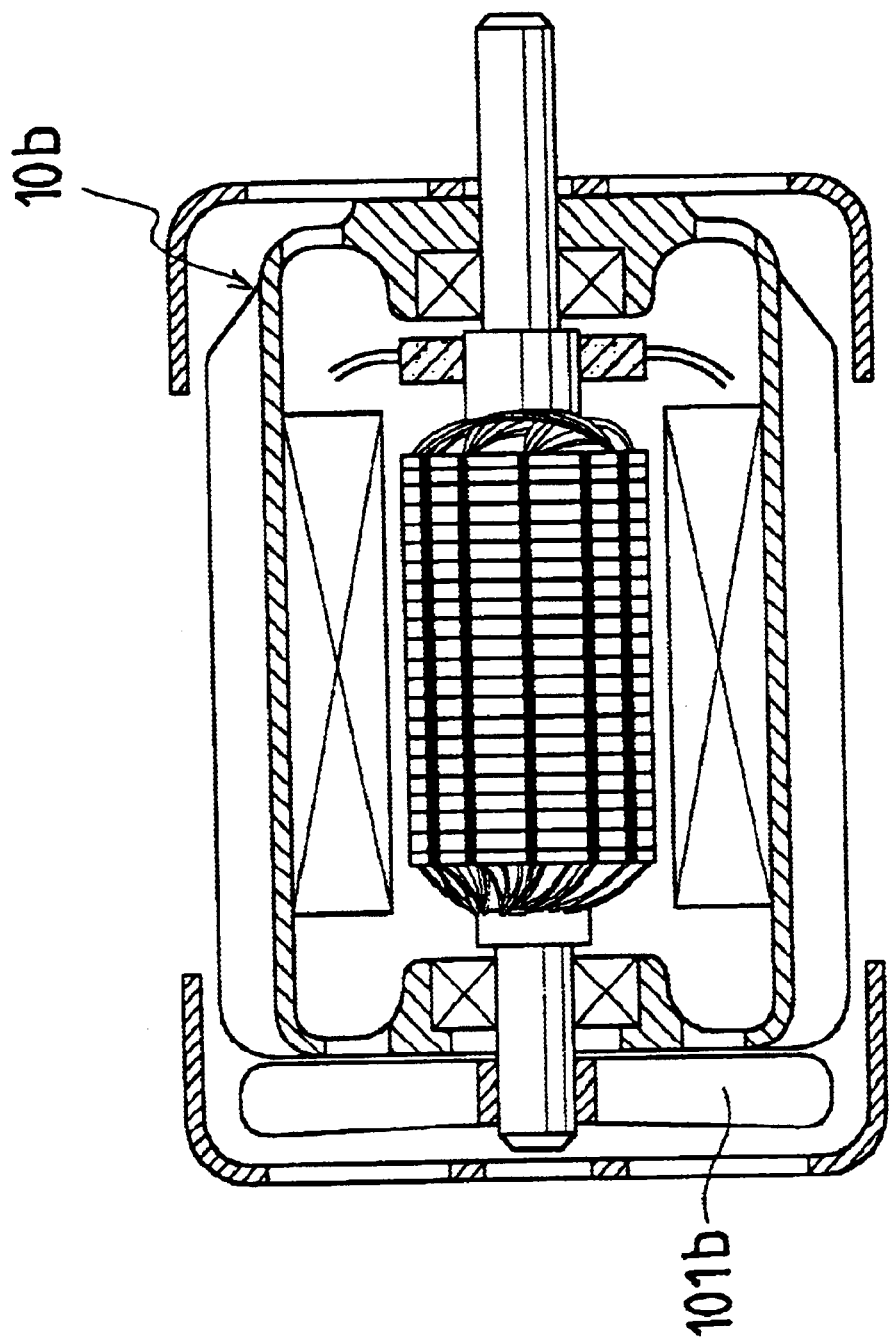
FIG. 3 is a diagram of a conventional forced air cooling structure of the enclosed type electrical machines.
Figure 4:
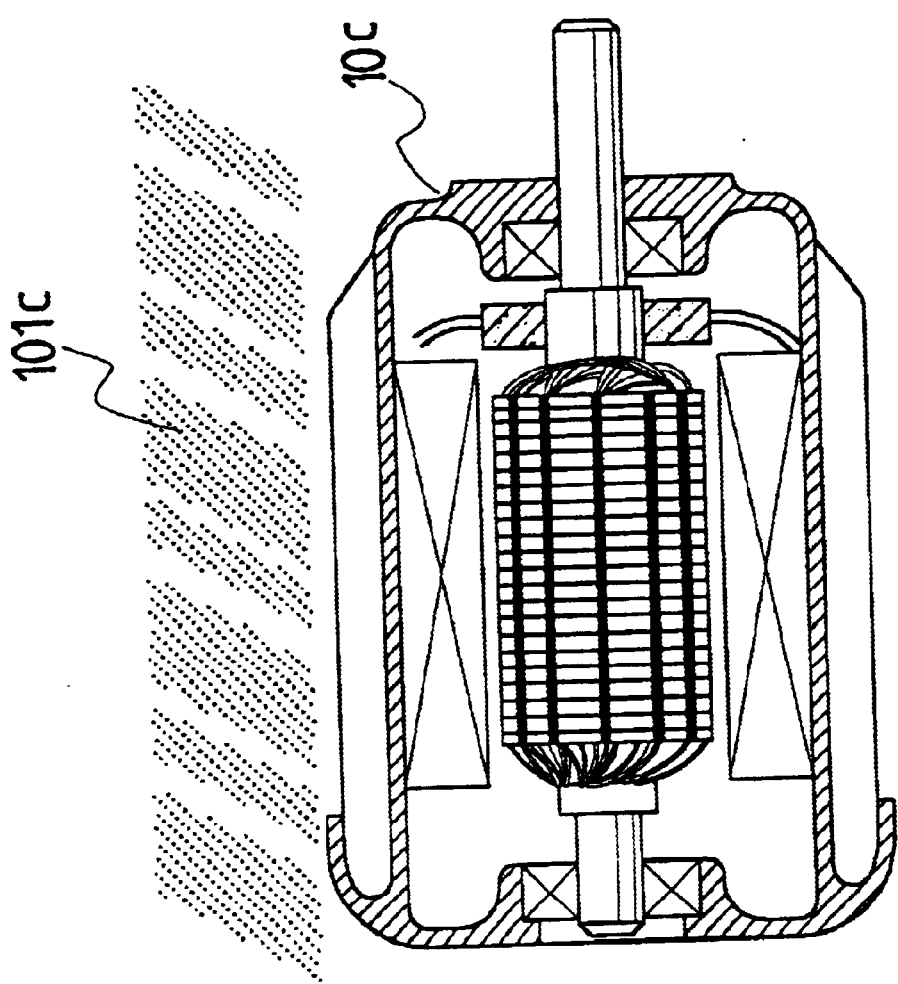
FIG. 4 is a schematic diagram of a conventional liquid cooling structure of the enclosed type rotational electrical machines.
Figure 6:
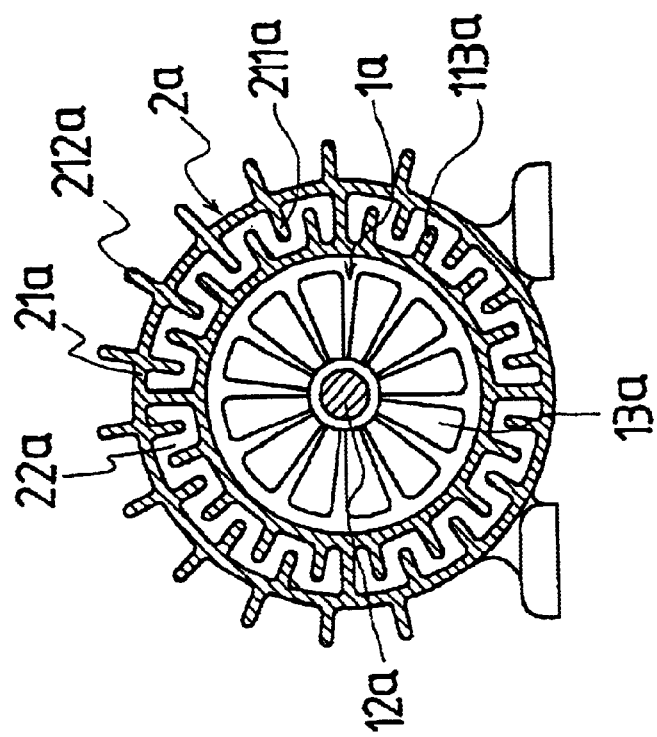
FIG. 6 is the cross-sectional view of the invention illustrating an integrated structure of the enclosed type rotational electrical machine and its cooler device.
Figure 5:
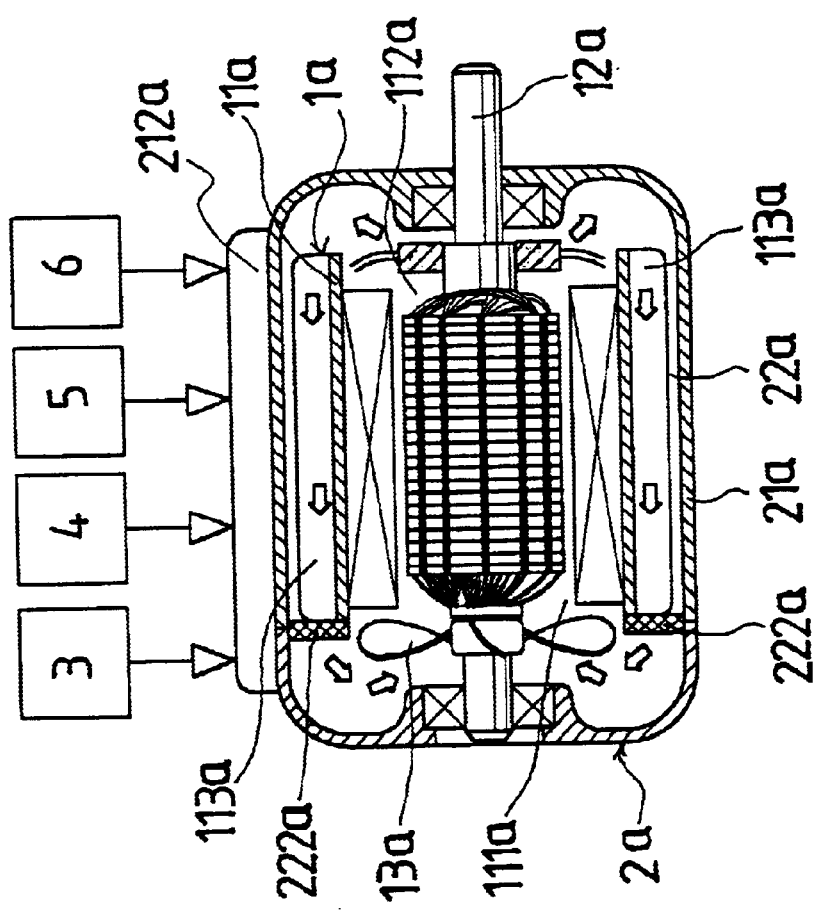
FIG. 5 is the longitudinal sectional view of the invention illustrating that the enclosed type rotational electrical machine and its cooler device are in an integrated structure.

FIGS. 5 and 6 show one of the embodying examples of the invention, whereof it is comprised of that an air outlet 112a and an air inlet 111a are provided at the front and rear end of the casing 11a of the said rotational electrical machine 1a, and an integrally installed air cooler device 2a is further installed at the outside of the casing 11a, and the rotational electrical machine 1a is enclosed by the casing 21a of the said cooler 2a, whereby the casing 21a of the cooler device 2a and the casing 11a of the rotational electrical machine 1a form a tubular space 22a which is connected with the inlet 111a and the outlet 112a; further, a centrifugal type radial or axial fan 13a is installed on the power output shaft 12a located at the outlet 112a side of the rotational electrical machine 1; wherein the casing 21a of the cooler device 2a can be installed with several heat dissipating fins 212a which allow the cooler device 2a to match with a free air cooler device 3, or to match with a conventional forced air cooler device 4; in addition, a cooling circuit can be further provided inside the cooler device to match with a liquid cooler device 5 or to match with a heat exchanger device 6; furthermore, the axial heat dissipating fins 113a, 211a are installed at the outside of the casing 11a and at the inside of the casing 21a to improve the heat conduction in the tubular space 22a, whereof the air or other gases inside the tubular space 22a between the rotational electrical machine 1a the cooler device 2a forms the cooling flow which constitutes the enclosed type air cooler device of the rotational electrical machine of the invention.

When the rotational electrical machine 1a produces power, the centrifugal type radial or axial fan 13a is simultaneously driven to rotate by the said power output shaft 12a to pump the cooling gas contained heat from the outlet 112a to the tubular space 22a constituted by the cooler device 2a and through the internally installed heat dissipating fins 111a, 211a to transfer heat energy as well as further through the cooler device 2a to match with a free air cooler device 3 or to match with a conventional forced air cooler device 4, besides, the internal cooling circuits can be further installed inside the cooler device to match with the other final cooler devices such as a liquid cooler device 5 or a heat exchanger 6, etc. thereby to produce heat dissipating function and the cooled down gas flow can be pumped back through the inlet 111a to the inside of the rotational electrical machine 1a, thus the accumulated heat inside the enclosed type rotational electrical machine casing can be effectively removed to improve the cooling effect.

Figure 8:
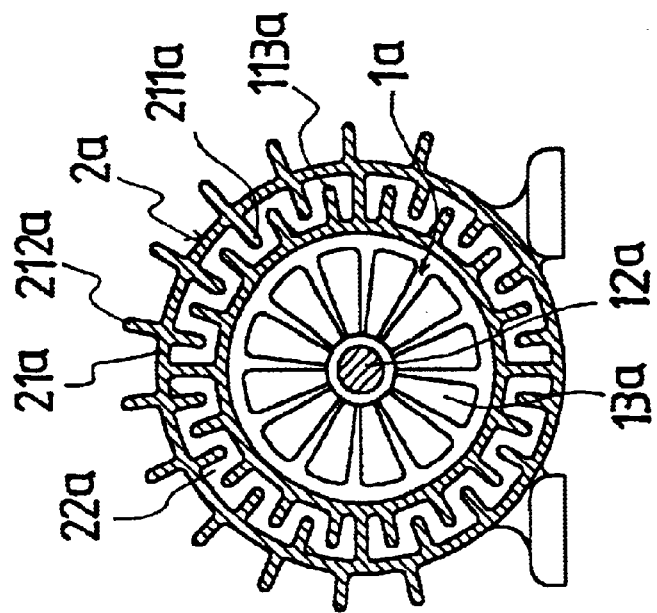
FIG. 8 is the cross-sectional diagram of the invention illustrating an integrated structure of the enclosed type rotational electrical machine and its cooler device.
Figure 7:
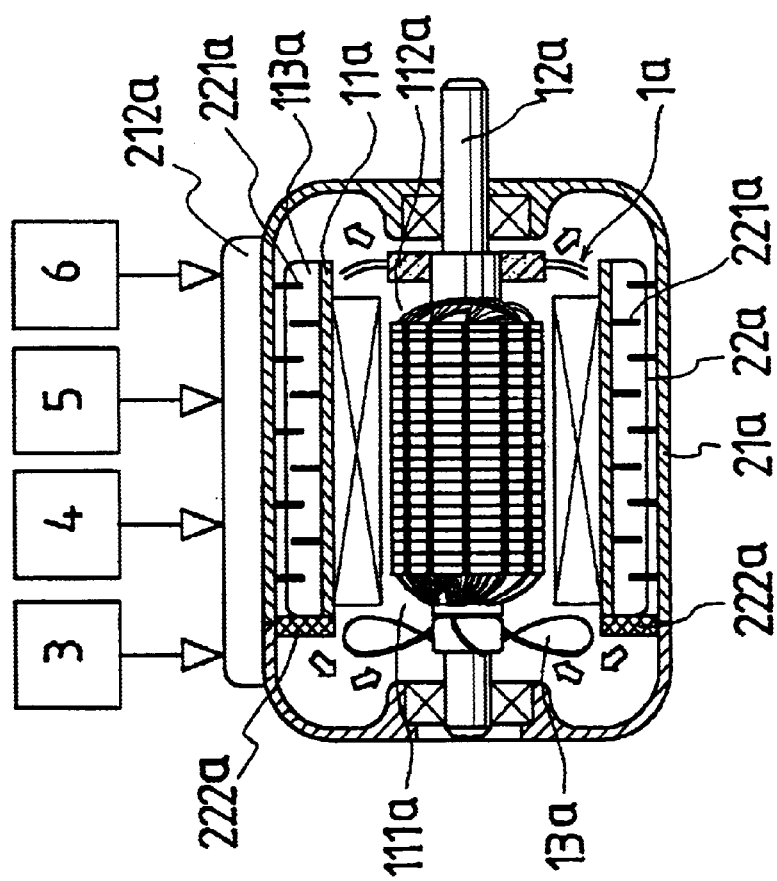
FIG. 7 is the longitudinal sectional view of the invention illustrating an integrated structure of the enclosed type rotational electrical machine and its cooler device with additional internally installed heat absorbing fins.

Besides, as shown in FIGS. 7 and 8 of the invention, the tubular space 22a between the said rotational electrical machine 1a and the cooler device 2a is installed with heat absorbing fins 221a which causes the tubular space 22a to form a blended circuit shape, and through this to allow the said heat absorbing fins 221a to absorb the hot gas heat and transfer it to the outside thereby to improve the heat dissipating effect of the rotational electrical machine.

Figure 9:
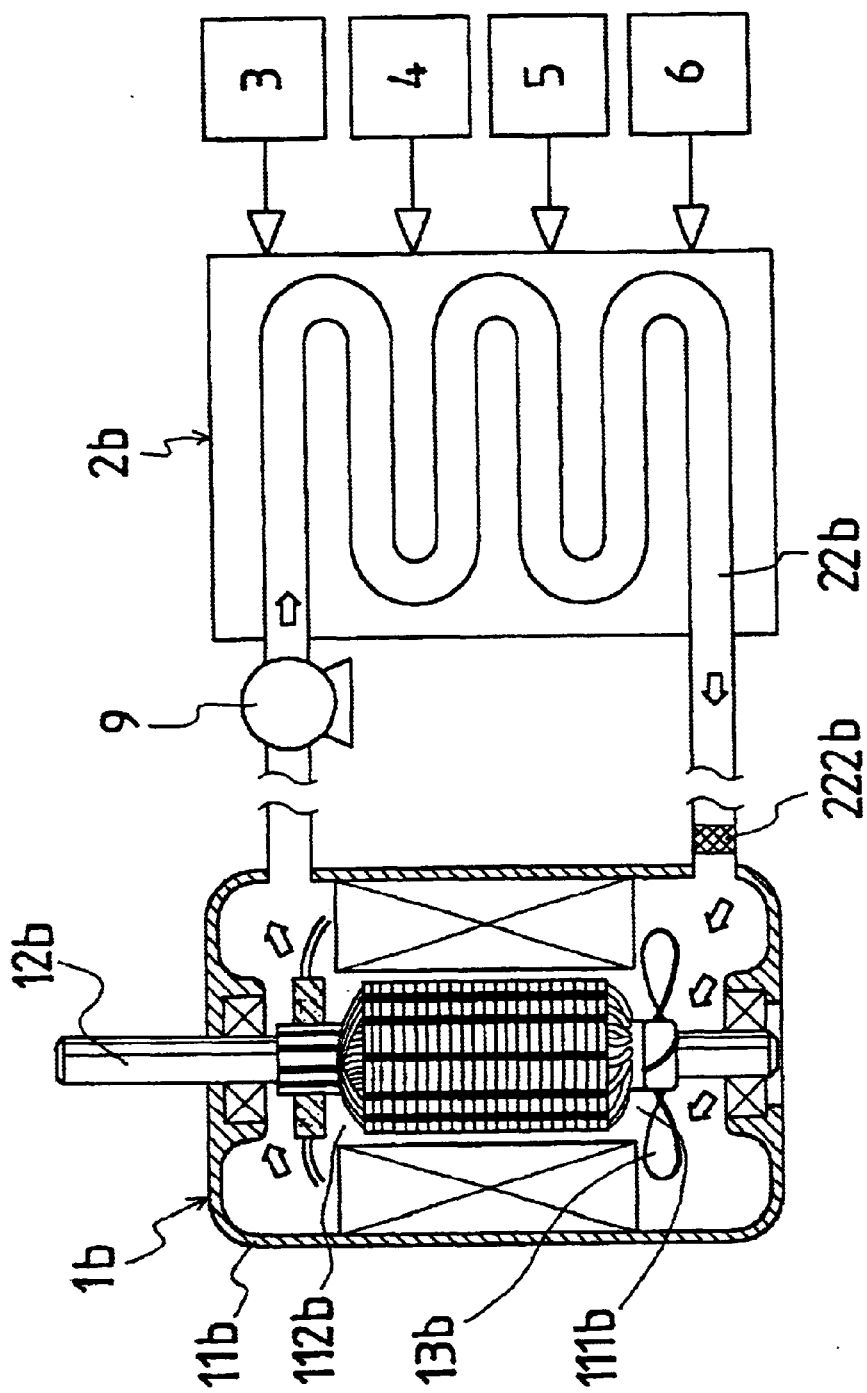
FIG. 9 is a structural schematic diagram illustrating that the enclosed type rotational electrical machine and its cooler device are separated.
Figure 10:
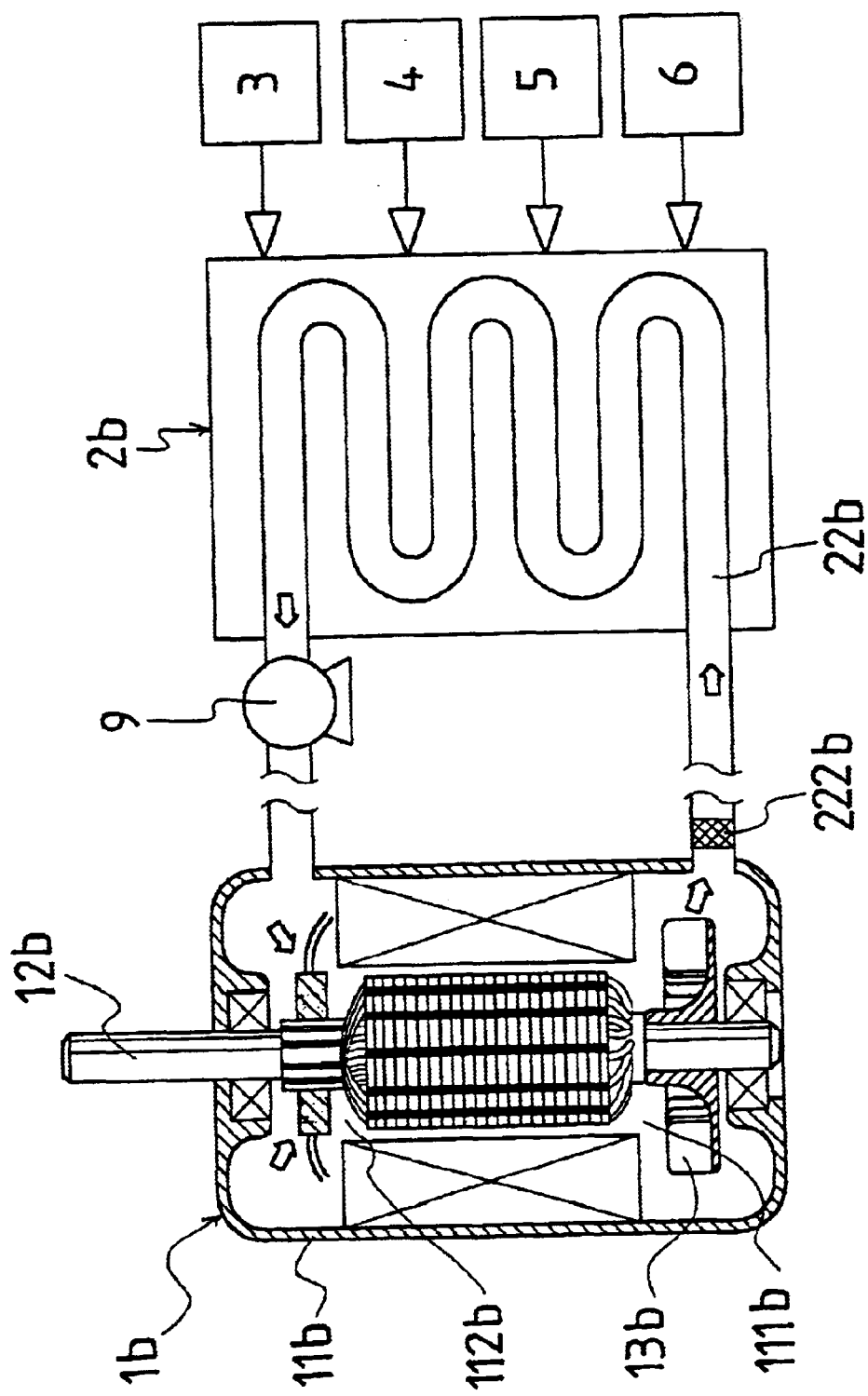
FIG. 10 is an embodying example schematic diagram of the centrifugal type radial fan of the invention.

In addition, as shown in FIG. 9 of the invention, the rotational electrical machine 1b and the cooler device 2b can be further made in the separated structures, whereof the inlet 111b and outlet 112b are provided at the casing 11b of the said rotational electrical machine 1b, whereof a centrifugal type radial or axial fan 13b is installed on the power output shaft 12b at the outlet 112b side (as shown in FIG. 10); whereof the said cooler device 2b forms a tubular circuit structure 22b which is not limited to a particular shape, besides of blended shape, it can be also formed to helical shape or other irregular shapes; whereof the said cooler device 2b can be matched with a free air cooler device 3 or the cooler device 2a can be matched with a forced air cooler device 4, and cooling circuits can be further installed inside the cooler device to match with a liquid cooler device 5 or to match with a heat exchanger 6, or the cooler device 2b can combine with several different cooling technologies to constitute in an integrated structure; through this, both ends of the tubular circuit structure 22b of the cooler device 2b are respectively connected to the inlet 111b and outlet 112b of the said rotational electrical machine 1b, wherein the rotational electrical machine 1b and the tubular circuit structure 22b of the cooler device 2b are filled in with air or other gases thereby to constitute the enclosed type air cooler device of the rotational electrical machine of the invention.

The effect of the aforesaid embodying example is that when the rotational electrical machine 1b produces power, the centrifugal type radial or axial fan 13b is simultaneously driven by the power output shaft 12b to rotate whereby to pump the hot gas inside the rotational electrical machine 1b through the outlet 112b to the outside tubular circuit structure 22b constituted by the cooler device 2b, whereof the cooler device 2b is matched with a free air cooler device 3 or matched with a conventional forced air cooler device 4, or the cooling circuit can be installed inside the cooler device to match with a liquid cooler device 5 or to match with a heat exchanger device 6; wherein the cooled down coolant gas flow is pumped through the inlet 111b of the rotational electrical machine 1b to enter the rotational electrical machine 1b interior to provide cooling for the rotational electrical machine, thereby the accumulated heat inside the enclosed type electrical machine casing can be effectively removed thus to improve the cooling effect of the rotational electrical machine 1b.

Figure 12:
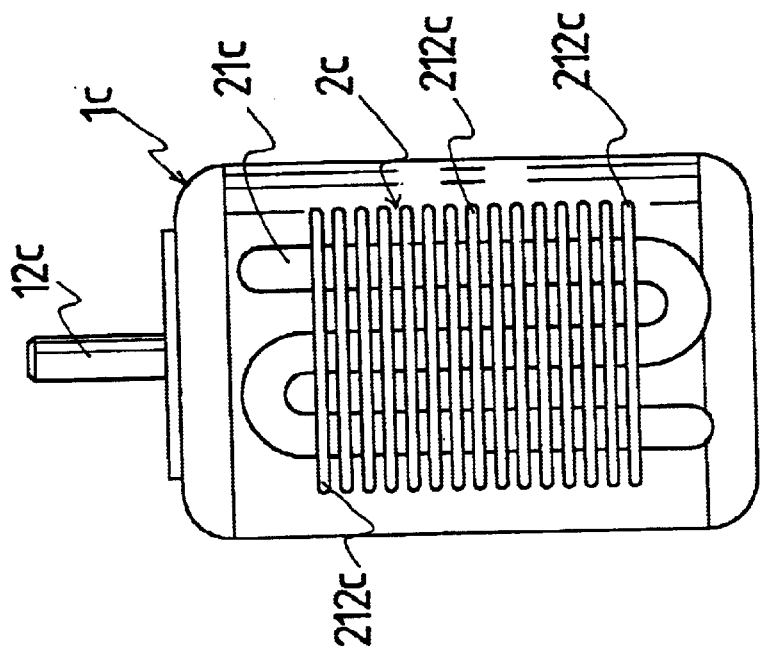
FIG. 12 is a structural side view of the invention illustrating that the tubular shape enclosed type rotational electrical machine and its cooler device are respectively independent and combined together.
Figure 11:
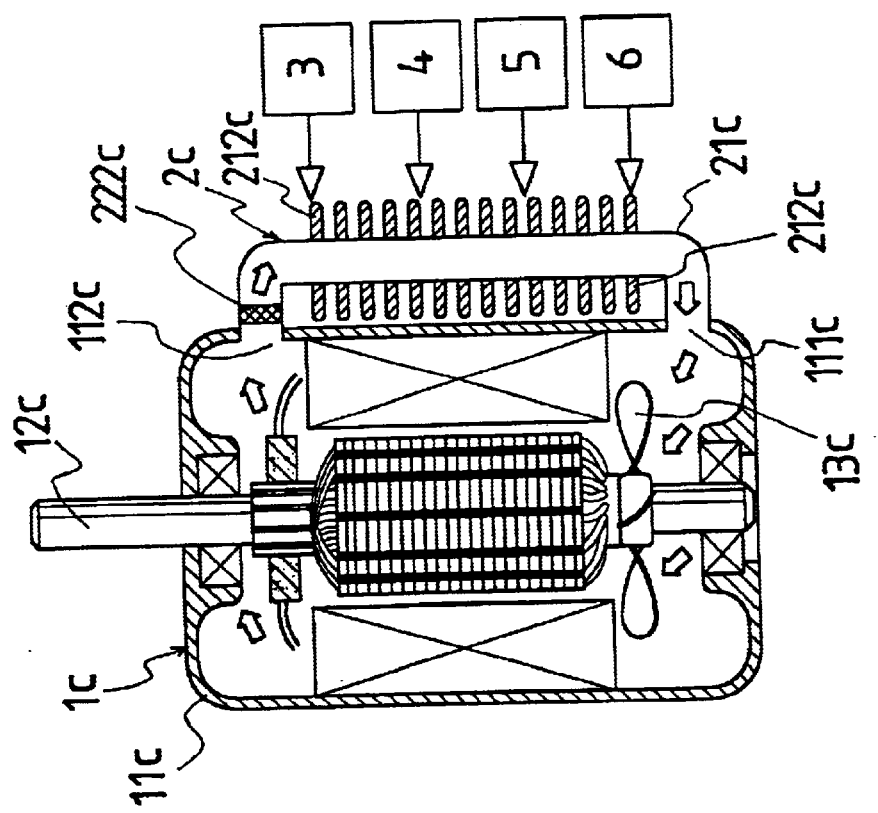
FIG. 11 is a structural sectional view of the invention illustrating that the tubular shape enclosed type rotational electrical machine and its cooler device are respectively independent and combined together.
Figure 13:
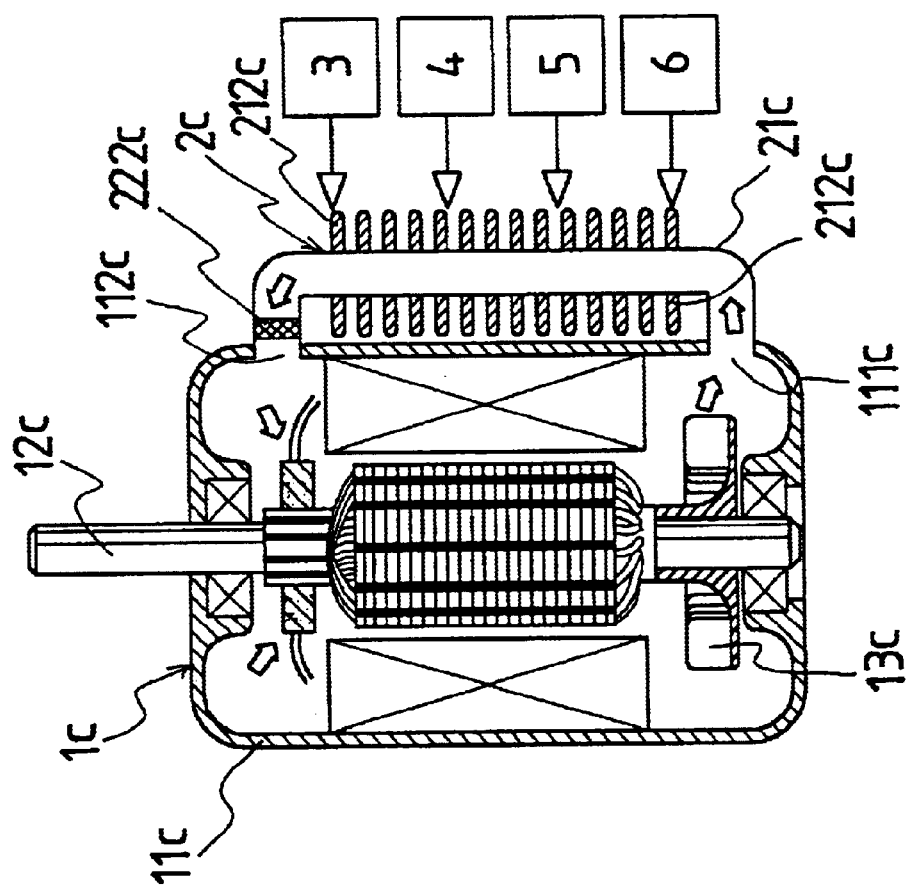
FIG. 13 is an embodying example schematic diagram of the centrifugal type radial fan of the invention.

As shown in FIGS. 11 and 12, the said cooler 2c is an independent structure and appear in a bended piping casing 21c, whereof one or more than one heat dissipating fins 212c are installed at the outside of the casing 21c; whereof the inlet 111c and outlet 112c are respectively provided at selected locations on the casing 11c of the said rotational electrical machine 1c, further, its internal power output shaft 12c is also installed with a centrifugal type radial or axial fan 13c (as shown in FIG. 13), wherein the inlet of the cooler device 2c is connected to the outlet 112c of the rotational electrical machine 1c, and the said cooler device 2c is further connected to the inlet 111c of the rotational electrical machine 1c to allow the said cooler device 2c to be attached or ring installed at the outside of the casing 11c whereby to cause the cooler device 2c and the casing of the rotational electrical machine 1c appear a special and inter-combined structure; thereby the hot gas is pumped to the cooler device 2c through the centrifugal type radial or axial fan 13c to achieve the aforesaid circulating heat dissipation effect.

Figure 15:
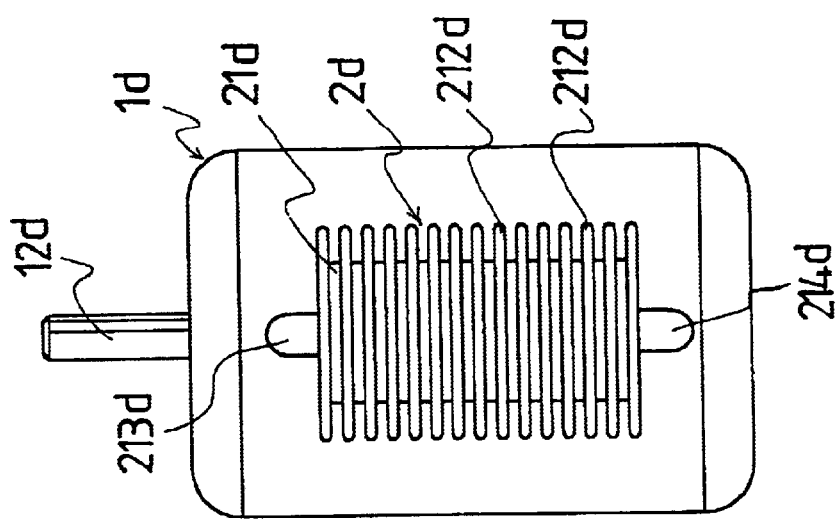
FIG. 15 is a structural side view of the invention illustrating that the air chamber type enclosed type rotational electrical machine and its cooler device are respectively independent and combined together.
Figure 14:
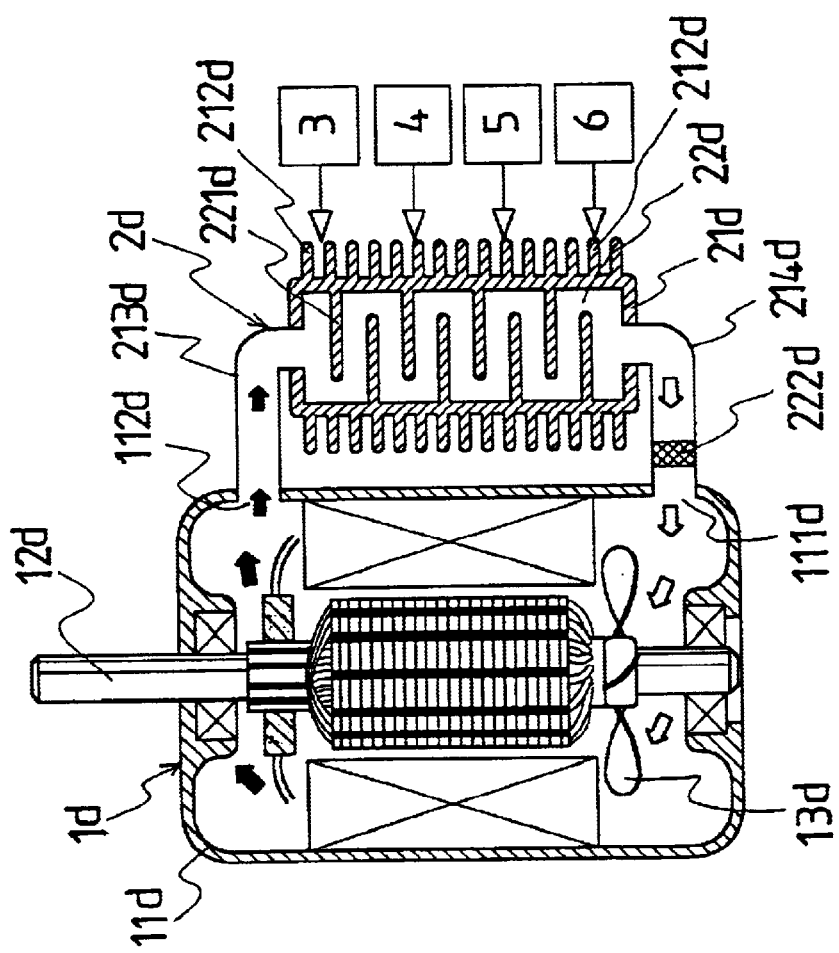
FIG. 14 is a structural sectional view of the invention illustrating that the air chamber type enclosed type rotational electrical machine and its cooler device are respectively independent and combined together.
Figure 16:
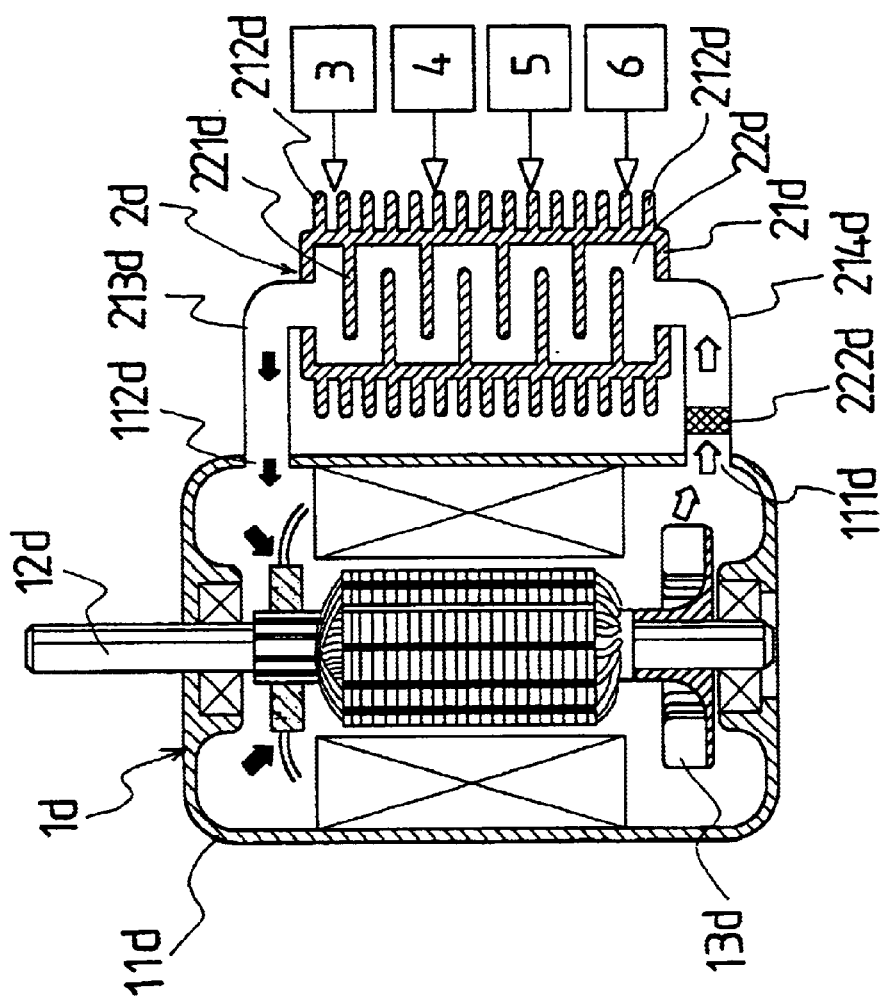
FIG. 16 is an embodying example schematic diagram of the centrifugal type radial fan of the invention.

The further embodying example structure of the invention is as shown in FIGS. 14 and 15, whereof the cooler device 2d is comprised of a casing 21d with an internally installed air chamber 22d, whereof the outside of the casing 21d is installed with several heat dissipating fins 212d and the inside of the air chamber 22d is installed with heat absorbing fins 221d whereby to cause the said air chamber 22d constitute a bended circuit shape, and the both ends of the casing 21d are respectively provided with inlet 213d and outlet 214d; besides, the inlet 111d and the outlet 112d are respectively provided at proper locations on the casing, 111d of the said rotational electrical machine 1d, whereof its internal power output shaft 12d is installed with a centrifugal type radial or axial fan 13d (as shown in FIG. 16), therein the inlet pipe 213d of the said cooler device 2d is connected to the outlet 112d of the rotational electrical machine 1d, while the outlet pipe 214d of the said cooler device 2d is further connected to the inlet 111d of the rotational electrical machine 1d thereby to allow the said cooler device 2d be attached to the outside of the casing 11d, wherein the cooler device 2d and the casing of the rotational electrical machine 1d are individually independent structures and they are further combined; thereby the hot gas is pumped to the cooler device 2d through the centrifugal type radial or axial fan 13d installed inside the said rotational electrical machine 1d to achieve the aforesaid circulating heat dissipating effect.

Figure 17:
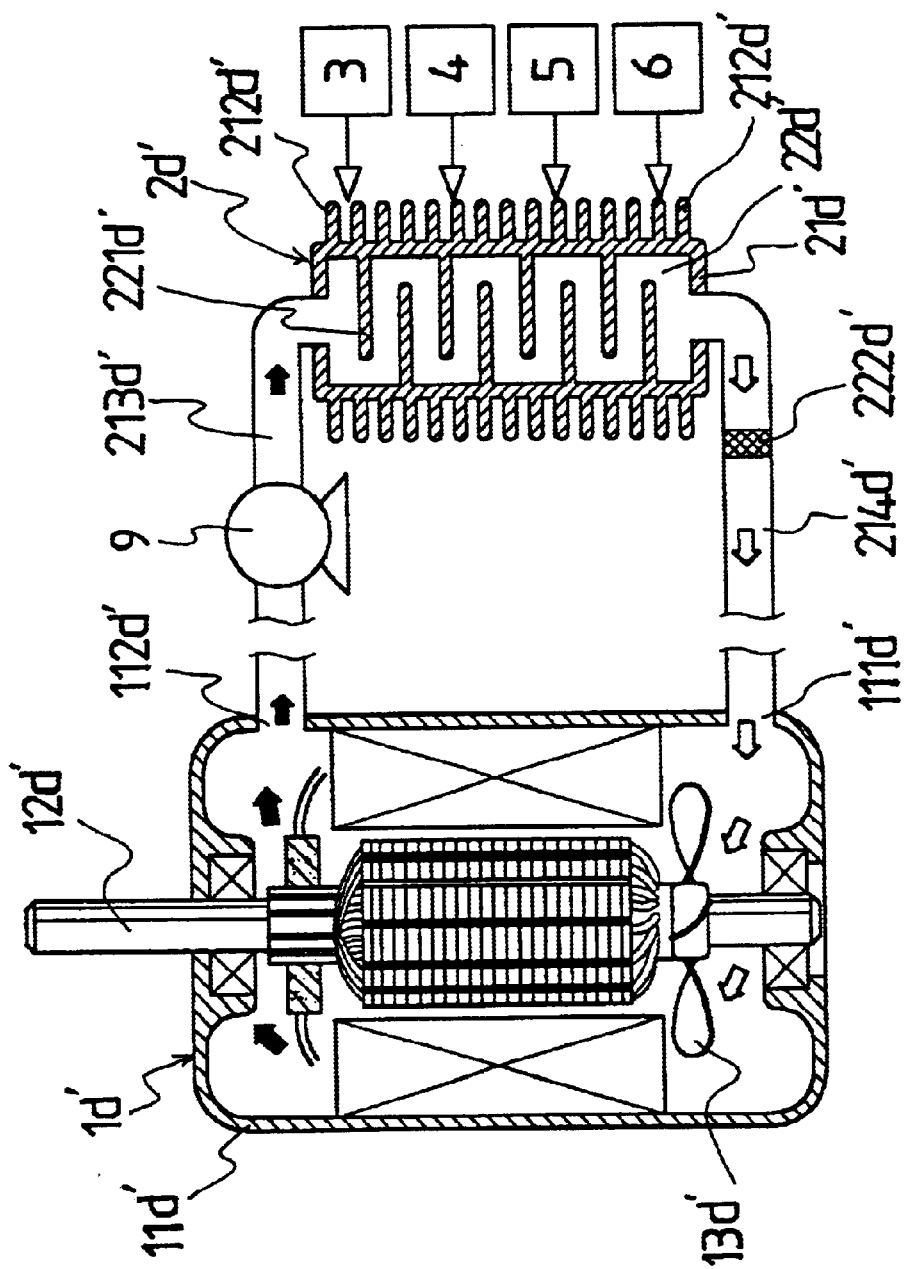
FIG. 17 is a structural sectional view of the invention illustrating that the air chamber type enclosed type rotational electrical machine and its cooler device are respectively independent and separately installed.
Figure 18:
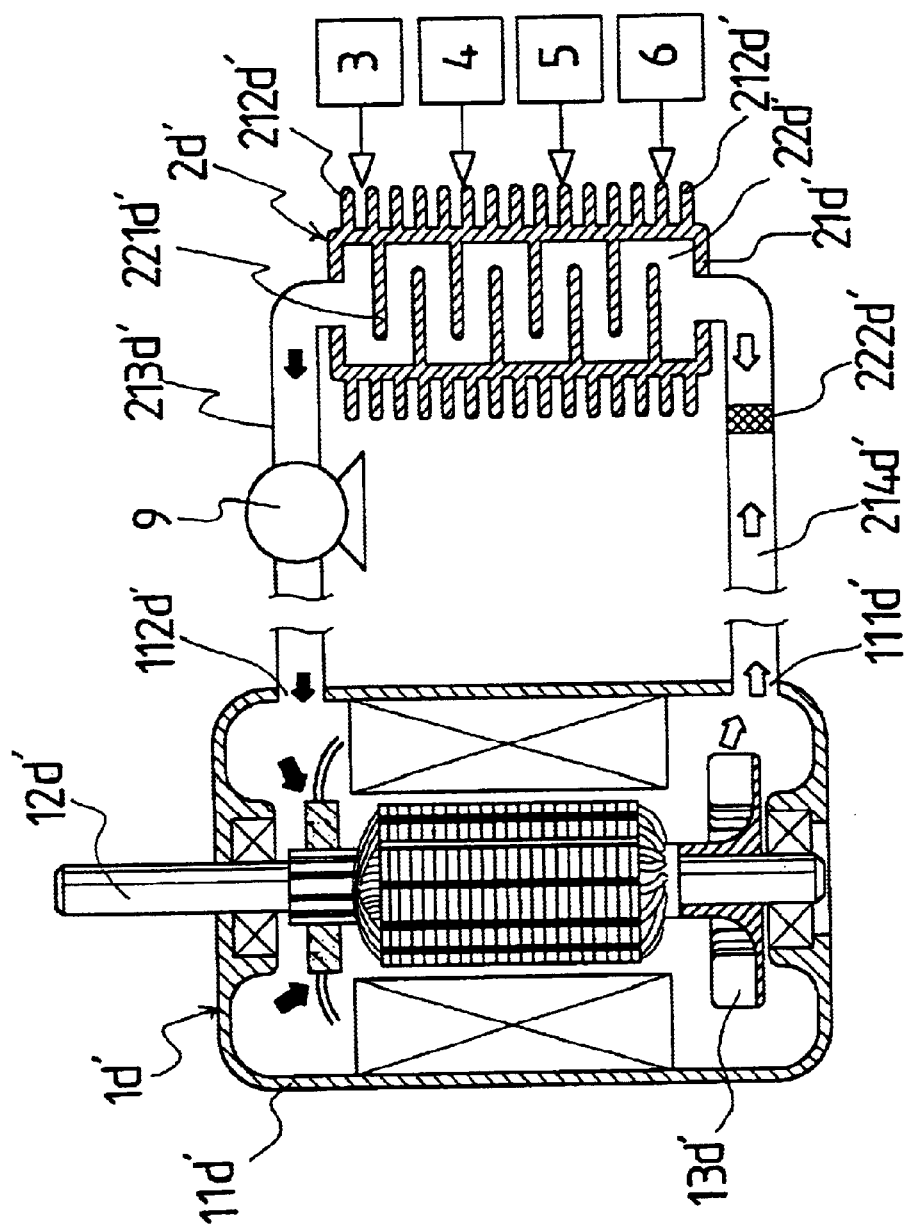
FIG. 18 is an embodying example schematic diagram of the centrifugal type radial fan of the invention.
Figure 19:
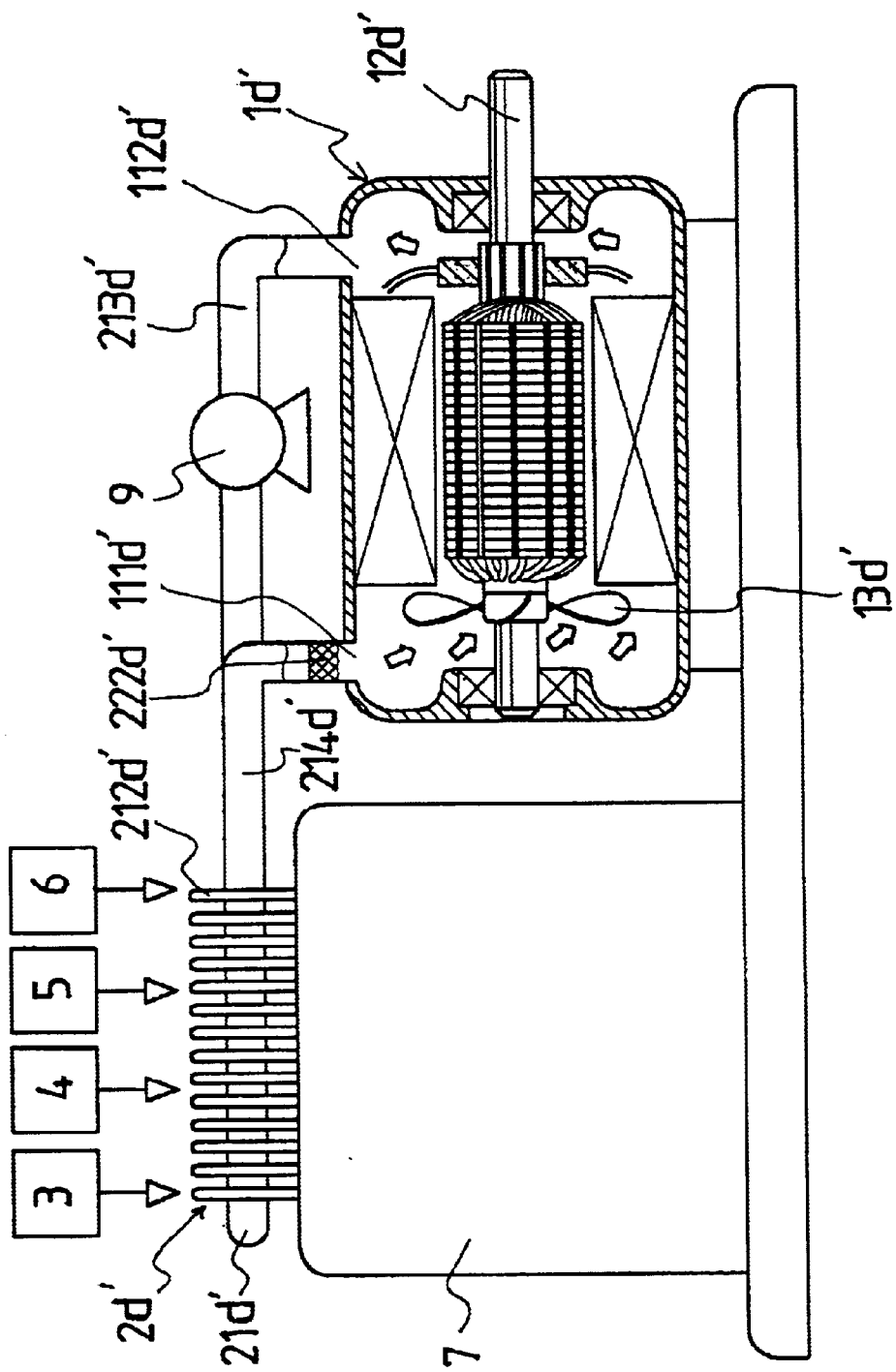
FIG. 19 is a structural schematic diagram of the invention illustrating that the enclosed type rotational electrical machine is combined with other mechanisms.
Figure 20:
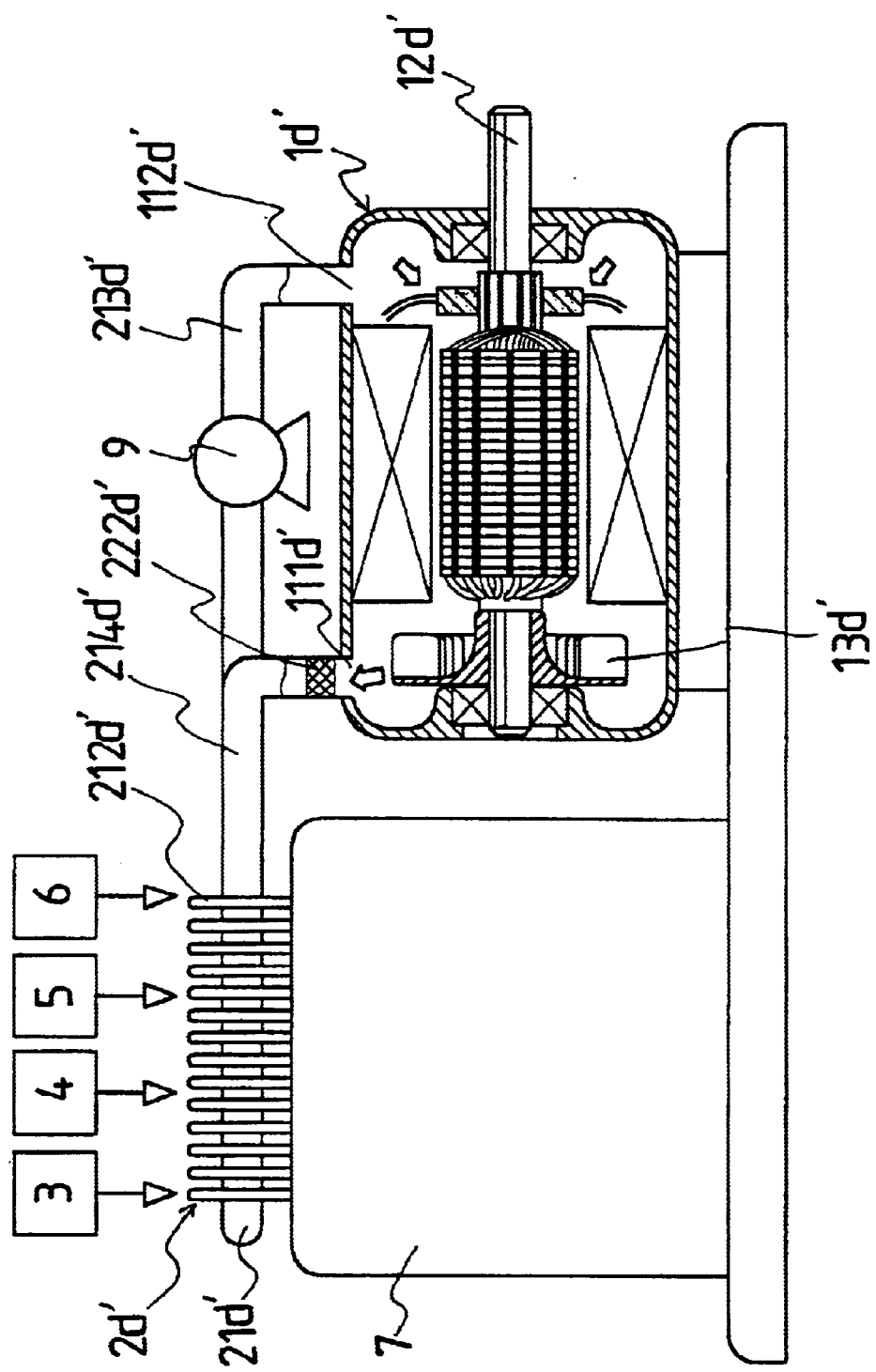
FIG. 20 is an embodying example schematic diagram of the centrifugal type radial fan of the invention.

The cooler device 2d' and the rotational electrical machine 1d' of the invention can also be separated (as shown in FIG. 17 or FIG. 18) and interconnected through the inlet pipe 213d' and the outlet pipe 214d' whereby to constitute an enclosed type air cooling circuit structure of the invention, wherein the said cooler device 2d' can be installed at other proper locations as required (as shown in FIG. 19 or FIG. 20), i.e. the cooler device 2d' can-be installed on the casing 7 of other machine and is further matched with a free air cooler device 3, or the cooler device 2a can be matched with a conventional forced air cooler device 4, in addition, the cooling circuits can be installed inside the cooler device to match with a liquid cooler device 5 or to match with a heat exchanger 6 whereby the hot gas inside the cooler device 2d' can be cooled and pumped to the rotational electrical machine 1d' interior to effectively remove the accumulated heat inside the enclosed type rotational electrical machine casing thereby to improve the cooling effect.

Figure 21:
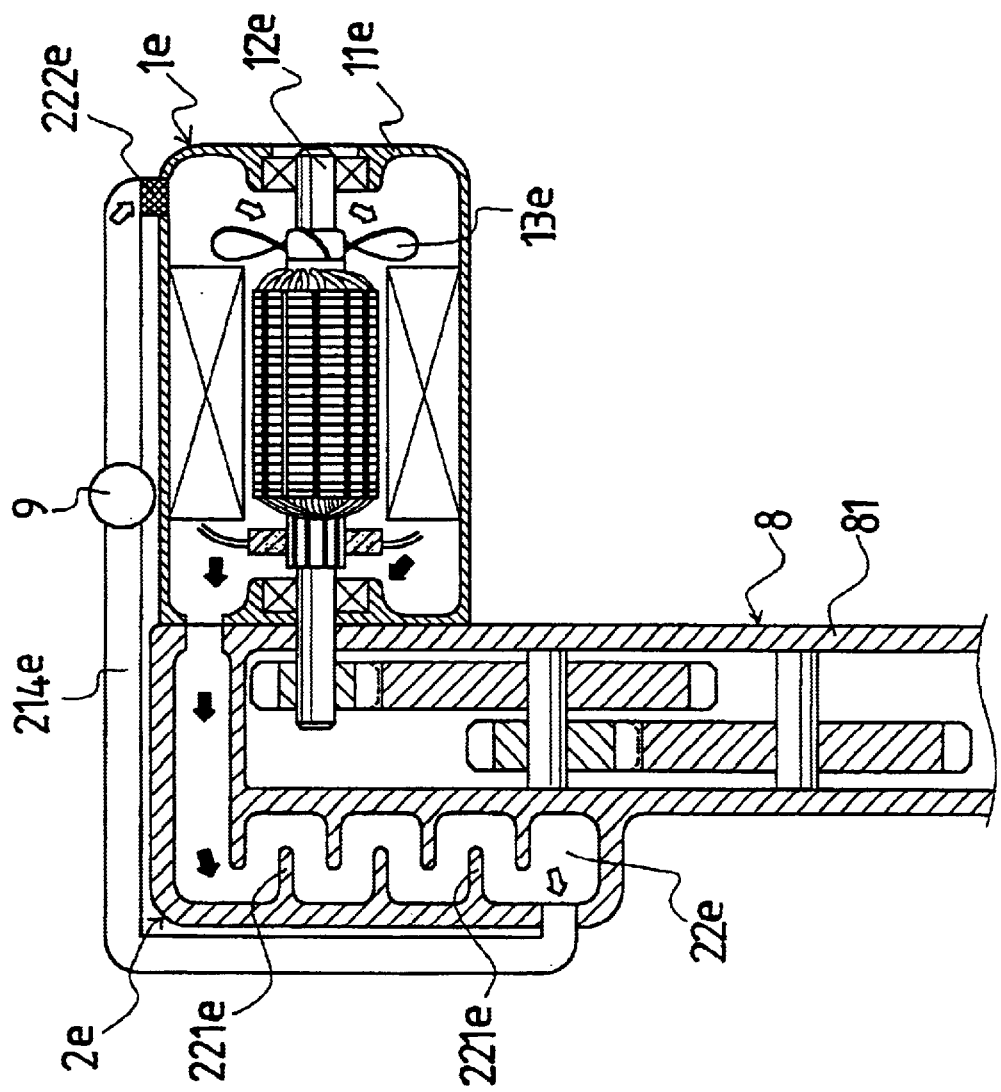
FIG. 21 is a structural sectional schematic diagram of the invention illustrating an integrated structure of the enclosed type rotational electrical machine and other mechanisms.
Figure 22:
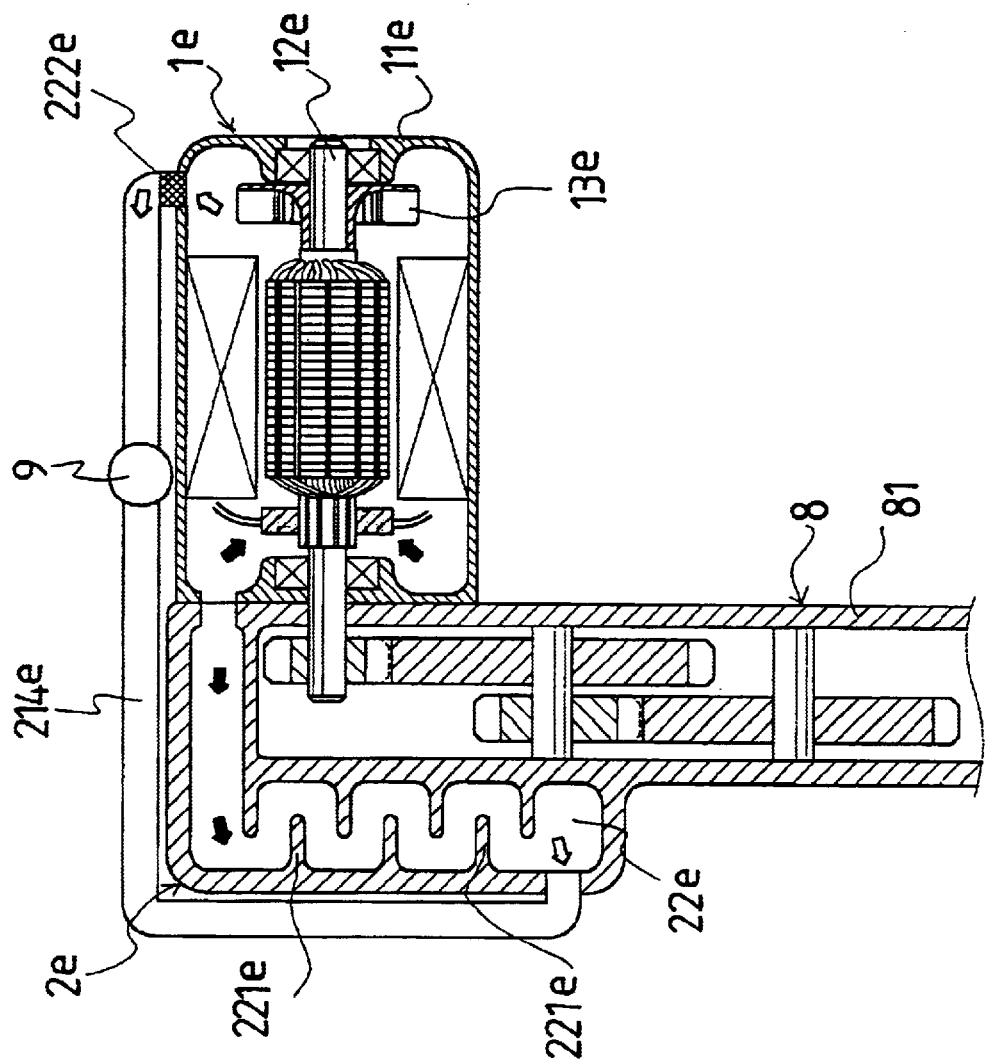
FIG. 22 is an embodying example schematic diagram of the centrifugal type radial fan of the invention.

In considering the economy of the structures, the cooler device of the invention can be directly designed to have an integrated structure with other devices (as shown in FIG. 21 or FIG. 22), whereof the cooler device 2e is in an integrated structure with the casing 81 of the transmission mechanism 8 and the outside of the casing 81 is made into a air chamber 22e, wherein several heat absorbing fins 221e are installed at the inside of the said air chamber 22e, and through the arrangement of the heat absorbing fins 221e to make the air chamber 22e constitute a bended circuit shape to improve its heat absorbing effect; thereof through the combination of the said rotational electrical machine 1e and the casing 81 of the transmission mechanism 8, its outlet 112e can be connected to the inlet of the cooler device 2e, and the circuit end of the air chamber 22e is connected with an outlet pipe 214e which is further connected to the inlet 111e of the rotational electrical machine 1e thereby to constitute the enclosed type cooling flow circuit structure of the invention whereby to achieve the aim of improving the heat dissipating effect of the rotational electrical machine.

In addition, the pumping methods for the cooling air or other gases in the invention include the following:

A centrifugal type radial or axial fan 13 is installed on the rotating shaft of the rotational electrical machine 1 to transfer the air or other gases, or:

A gas pump 9 is further installed at the locations such as the inlet 111 or outlet 112 or pipe 22 or the cooler device to pump the air or other gases inside the rotational electrical device 1, or A centrifugal type radial or axial fan 13 is simultaneously installed at the rotating shaft of the rotational electrical machine 1, and a gas pump 9 is further installed at the locations such as such as the inlet 111 or outlet 112 or pipe 22 or the cooler device 2 to pump the air or other gases inside the rotational electrical device 1.

The internal air chamber of the cooler device 2 in the aforesaid embodying examples can bean empty space or installed with internal heat conducting fins or can be further installed with air filter devices 222a, 222b, 222c, 222d, 222e or simultaneously installed with an clean cover or clean plug for opening/closing to remove the condensed moisture or the internally eroded fragment powders generated inside the rotational electrical machines 1a, 1b, 1c, 1d, 1e, such as the brush fragment powders of the DC machines thereby to avoid affecting the operating functions.

Figure 23:
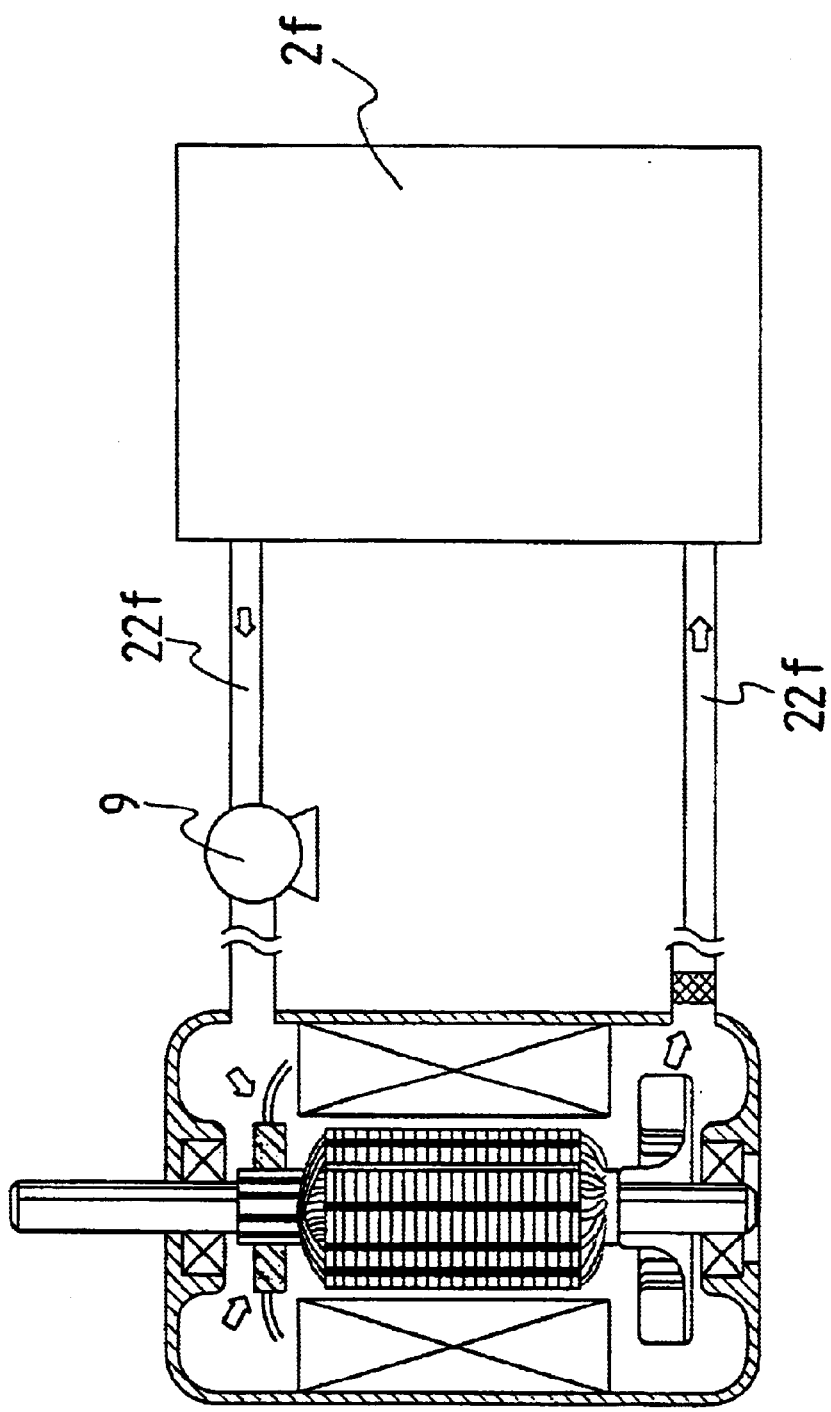
FIG. 23 is a schematic diagram of the invention illustrating that the cooler device is used as for heating source.
Figure 24:
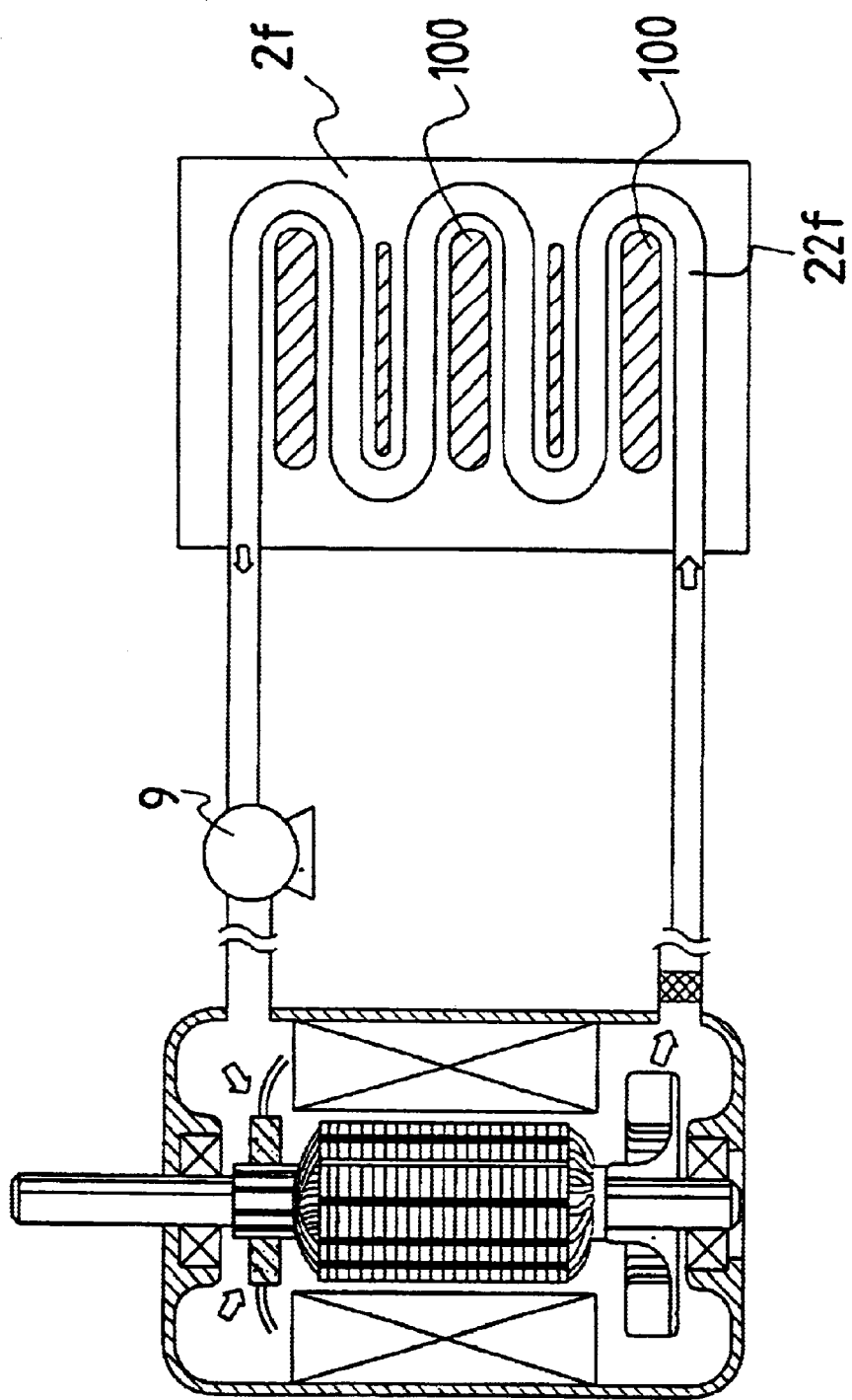
FIG. 24 is a schematic diagram of the invention illustrating a free heating cooler device structure.
Figure 25:
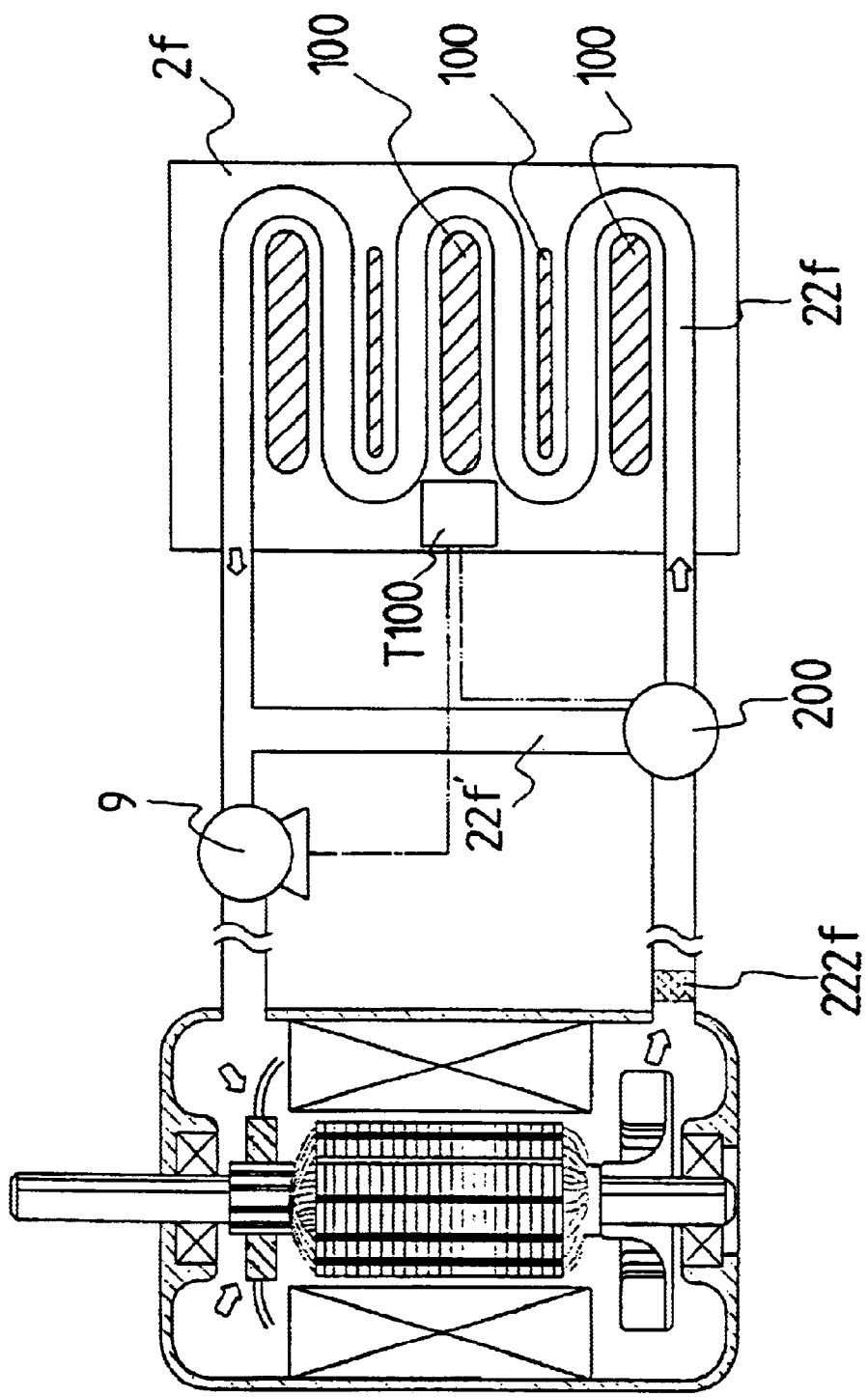
FIG. 25 is a schematic diagram of the invention illustrating a controlled heating cooler structure.
Figure 26:
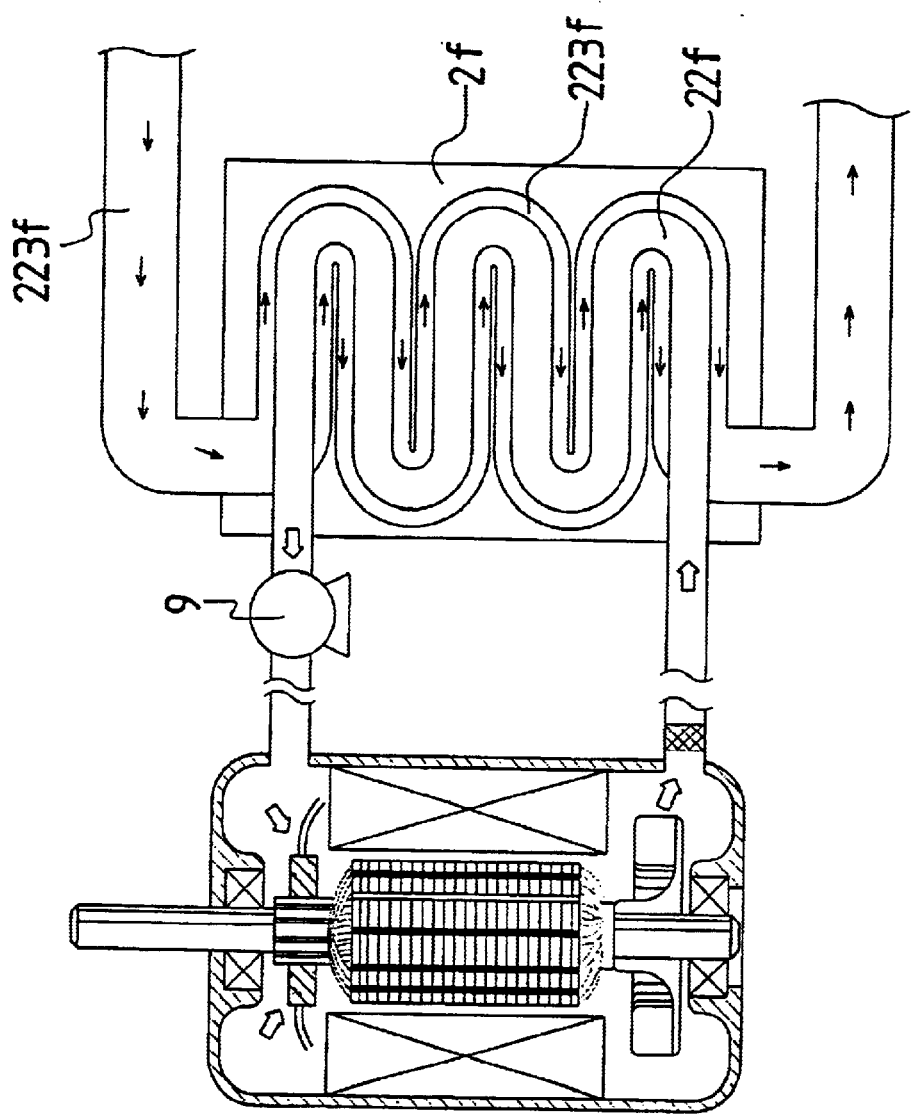
FIG. 26 is a schematic diagram of the invention illustrating that the cooler device is installed with air pass tubes.

Besides, as shown in FIG. 23 and FIG. 24, the said cooler device 2f of the invention can also be used to provide a heating source function, wherein the pipe 22f can be coupled with the heating target 100, and the hot gas produced by the rotational electrical machine 1 is passed through the pipe 22f to heat up the heating target coupled with the pipe 22f such as the car batteries. Thereof, a distributing pipe 22f' and a control valve 200 (as shown in FIG. 25) can be further installed between the inlet and outlet of the pipe 22f toward the heating target 100 to provide a bypassed or distributed hot gas flow for the cooler device 2f, and to further control the heating temperature of the heating target through switching the said control valve 200; therein the said control valve 200 can be operated manually or controlled through detection of the conventional temperature sensor device T100 which is selectively installed according to the requirements on the heating target to do bypass or distributing flow when reaching the set temperature in order to reduce or stop the heating process on the target objects; or the outside of the said pipe 22f as shown in FIG. 26 can be further installed with a air guiding pipe 223f to provide heat exchanged output from the hot gas flow produced by the rotational electrical machine so as to provide heating gas for other places' use, such as to produce warming effect in an enclosed or semi-enclosed space or warming up the car battery, etc.

As summarized from the above descriptions, the invention has disclosed an innovative design of an enclosed type air cooler device of the rotational electrical machine, wherein it is characterized in that the hot gas inside the enclosed type rotational electrical machine is pumped out to the outside air cooler device in an enclosed type air flow circuit and is then pumped back to the inside of the enclosed type rotational electrical machine without jeopardizing its enclosed function, therein it effectively improves the cooling effect of the enclosed type rotational electrical machine.

What is claimed is:

1. An air cooler for an enclosed electrical machine,
   wherein the enclosed electrical machine includes a casing having an inlet and an outlet, and
   wherein said air cooler comprises:
   a heat dissipation device;
   a closed coolant circulation structure that connects said outlet with said heat dissipation device, and that connects said heat dissipation device with said inlet; and
   a fan situated within the casing and arranged to pump a coolant out of the casing through said outlet and through said closed coolant circulation structure to said heat dissipation device said fan being further arranged to pump said coolant back into said casing from said heat dissipation device through said closed coolant circulation structure and through said inlet and
   wherein at least said heat dissipation device is an independent structure relative to said casing.

2. An air cooler device as claimed in claim 1, wherein said fan is driven by an output shaft of the rotational electrical machine.

3. An air cooler device as claimed in claim 1, wherein said fan is driven by an output shaft of the rotational electrical machine, and further including a separate gas pump in said closed coolant circulation structure.

4. An air cooler device as claimed in claim 1, wherein said closed coolant circulation structure is integral with said casing, wherein said casing includes heat dissipating fins for transferring heat to said closed coolant circulation structure, and wherein said heat dissipation device includes heat dissipating fins for transferring heat from said closed coolant circulation structure to an exterior of said closed coolant circulation structure and casing.

5. An air cooler device as claimed in claim 1, wherein said closed coolant circulation structure and heat dissipation device comprise tubular structures, each installed with exterior and interior cooling fins.

6. An air cooler device as claimed in claim 1, wherein said heat dissipation device comprises an air chamber having interior and exterior cooling fins.

7. An air cooler device as claimed in claim 1, wherein a filter is installed in said closed coolant circulation structure.

8. An air cooler device as claimed in claim 1, wherein said closed coolant circulation structure includes a removable closing means for permitting access to an interior of the closed coolant circulation structure for maintenance and cleaning.

9. An air cooler device as claimed in claim 8, wherein the removable closing means is a cover.

10. An air cooler device as claimed in claim 8, wherein the removable closing means is a plug.

11. An air cooler device as claimed in claim 1, wherein the inlet and outlet are respectively provided at a front end and a rear end of the casing, wherein the heat dissipation device is installed on an exterior of said casing, and wherein a casing of the air cooler device encloses said casing of the electrical machine to form said closed coolant circulation structure.

12. An air cooler device as claimed in claim 11, wherein a power output shaft located at an outlet side of the rotational electrical machine is installed with said fan.

13. An air cooler device as claimed in claim 11, wherein said casing of the heat dissipation device includes several heat dissipating fins on said casing of the air cooler device.

14. An air cooler device as claimed in claim 1, wherein said enclosed rotational electrical machine is a transmission mechanism and an outside of the casing forms an air chamber, and wherein several heat absorbing fins are installed at an inside of the air chamber to transfer additional heat from the interior of the transmission mechanism to the air chamber, the air chamber having a bent circuit shape to increase a heat absorbing effect.

15. An air cooler device as claimed in claim 1, wherein the heat dissipation device is a liquid cooler device.

16. An air cooler device as claimed in claim 1, wherein heat dissipated by said heat dissipation device heats a heating target.

17. An air cooler device as claimed in claim 16, wherein the heating target is a car battery.

18. An air cooler device as claimed in claim 16, wherein the closed coolant circulating structure includes a distributing pipe and a control valve for controlling an amount of hot coolant that flows through the distributing pipe past the heating target.

19. An air cooler device as claimed in claim 18, wherein the control valve is arranged to be operated based on input from a temperature sensor installed on the heating target.

20. An air cooler device as claimed in claim 18, wherein an outside of said distributing pipe is further installed with an air guiding pipe to provide heat exchanged output to additional heating targets.

21. An air cooler for an enclosed electrical machine,
   wherein the enclosed electrical machine includes a casing having an inlet and an outlet, and
   wherein said air cooler comprises:
   a heat dissipation device;
   a closed coolant circulation structure that connects said outlet with said heat dissipation device and that connects said heat dissipation device with said inlet;
   a fan situated within the casing and arranged to pump a coolant out of the casing through said outlet and through said closed coolant circulation structure to said heat dissipation device, said fan being further arranged to pump said coolant back into said casing from said heat dissipation device through said closed coolant circulation structure and through said inlet; and
   wherein said closed coolant circulation structure includes an inlet pipe and an outlet pipe.

* * * * *